Figure 1:
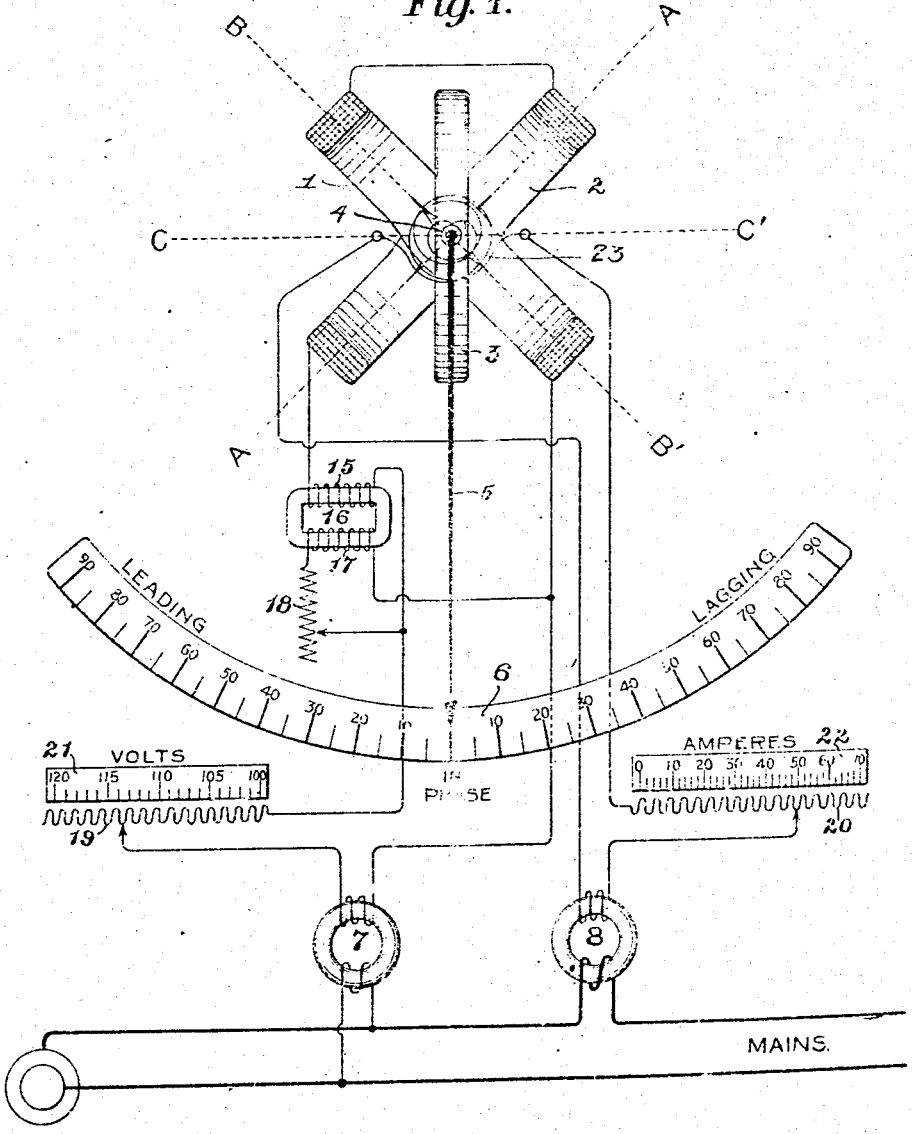

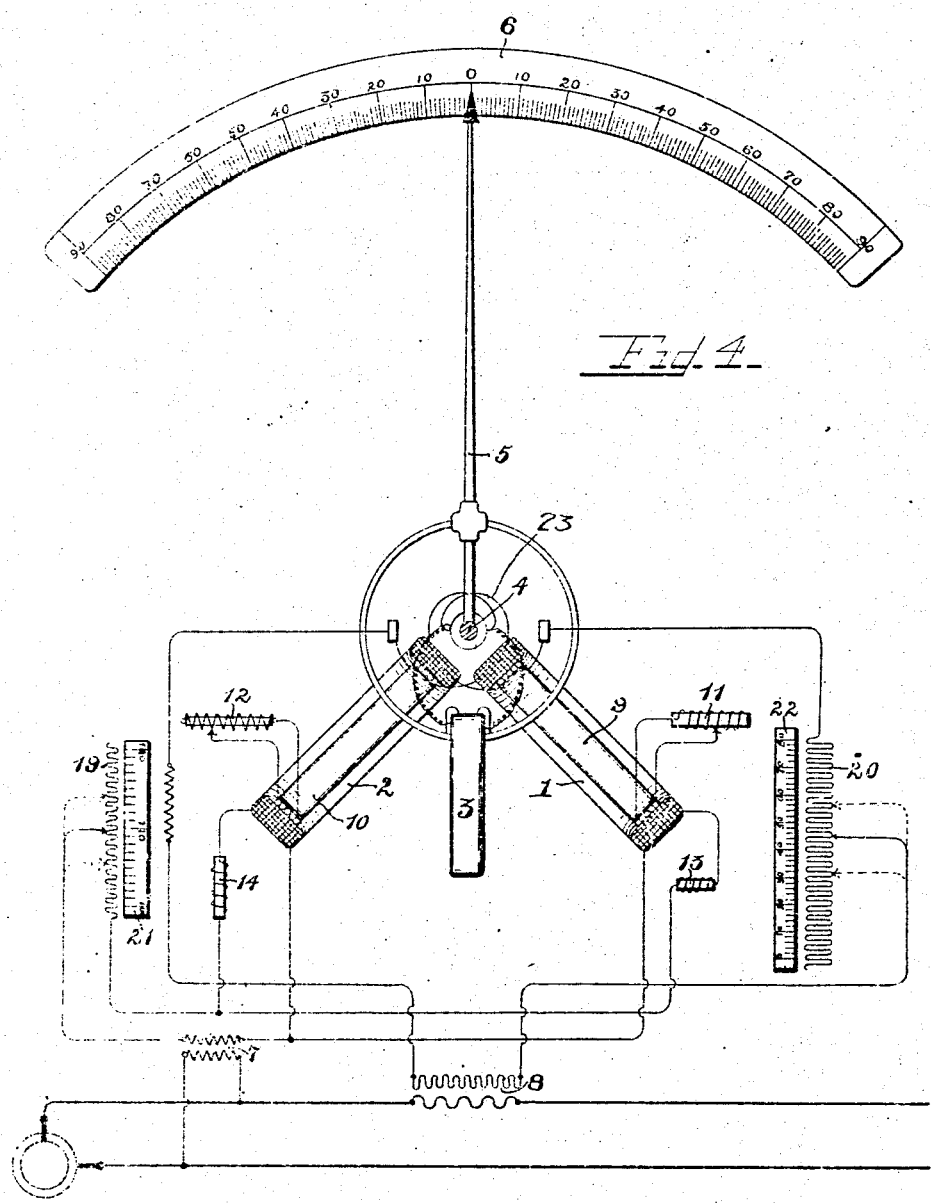

No. 769,984.
Patented September 13, 1904.

UNITED STATES PATENT OFFICE.

THOMAS DUNCAN, OF CHICAGO, ILLINOIS.

ELECTRICAL MEASURING INSTRUMENT.

SPECIFICATION forming part of Letters Patent No. 769,984, dated September 13, 1904.

Application filed June 26, 1901. Serial No. 66,099. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 2,) of which the following is a full, clear, concise, and exact description, reference being had to the accompanying drawings, forming a part of this specification.

My invention relates to means for indicating the phase difference between the current and pressure in alternating-current circuits, and has for its object the provision of means whereby such difference in phase may be determined by a single measuring element, and whereby it may be determined whether the current leads or lags with respect to the pressure. To accomplish this object, I provide a current field-winding producing magnetism that varies in phase with the magnetism of the current in the working circuit and associate with this current-winding two pressure-windings, which coact with the current-winding to effect the movement of a measuring-needle to indicate the extent the current may lag or lead with respect to the impressed pressure.

In practicing my invention I preferably provide pressure-windings that produce fields in quadrature with the impressed pressure, the fields due to these pressure-windings being one hundred and eighty degrees apart in phase. The magnetism due to the current-winding is displaced ninety degrees from the magnetism due to either of the pressure-windings when the current in the working circuit is in phase with the impressed electromotive force. To secure a movement of the measuring element or indicating-needle to indicate a variation in phase between the current and impressed electromotive force, the said current-winding is made movable with respect to the pressure-windings, the current-winding itself being preferably rotatable and carrying the indicating-needle. The current-winding is so disposed upon its shaft that when the current and pressure in the working circuit are in phase the current-winding lies midway between the pressure-windings and is unaffected thereby. Upon change in phase between the current and the impressed pressure the field of the current-winding of the instrument will correspondingly vary in phase, whereby one or the other of the magnetic axes due to the pressure-windings will cause the magnetic axis of the current field-winding to approach the same until a balance is brought about between the three magnetic fields of the instrument, as a result of which the indicating-needle is brought to one side or the other of a central position to indicate whether or not the current leads or lags and to what extent. I preferably associate with the indicating-needle a scale, upon which scale marks are provided indicating in degrees the lagging or leading angles. This scale thus marked will also indicate to those skilled in the art the power factor of the system—that is, the scale-marks indicating ten degrees lag or lead correspond to the power factor of .9848, the scale-marks "20" correspond to the power factor of .9397, the scale-marks "30" correspond to the power factor of .866, the scale-marks "40" correspond to the power factor of .766, the scale-marks "50" correspond to the power factor .6428, the scale-marks "60" correspond to the power factor of .5, the scale-marks "70" correspond to the power factor of .342, the scale-marks "80" correspond to the power factor of .1736, and the scale-marks "90" correspond to the power factor of 0.

Means are provided whereby the measurements of the instrument will not be modified by a variation in current and pressure, for which purpose I prefer to maintain the magnetism due to each winding constant, which result may be accomplished by including in circuit with the pressure-windings a resistance that may be varied to conform to the varying current and pressure, more resistance being included when the pressure in the working circuit increases and the resistance being cut out as the pressure decreases, while a similar resistance is included in circuit with the current-winding, the resistance being increased upon an increase in current in the working circuit and decreased upon a decrease of the current in the working circuit.

I will explain my invention more fully by reference to the accompanying drawings, illustrating the preferred embodiment thereof, in which—

Figure 2:
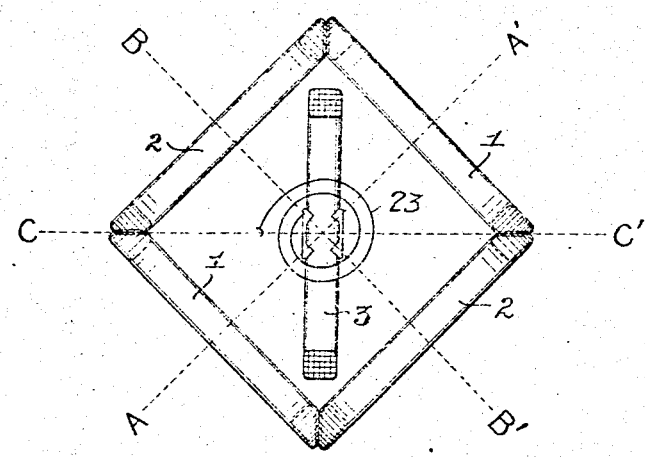
Figure 3:
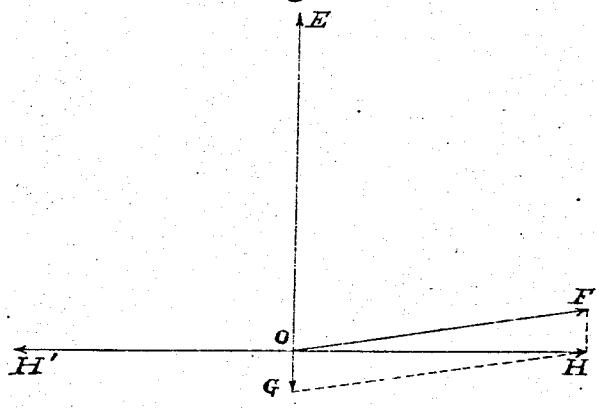

Figure 1 is a diagrammatic view illustrating a circuit including an alternating-current generator and the instrument of my invention associated therewith. Fig. 2 is a modified arrangement of the field-coils that may enter into the construction of the instrument illustrated in Fig. 1. Fig. 3 is a vector diagram illustrating the phase relations of the magnetic fields due to the pressure-windings. Fig. 4 illustrates a modification of the instrument constructed in accordance with my invention, the instrument there shown being associated with a circuit including an alternating-current generator.

Like parts are indicated by similar characters of reference throughout the different figures.

The pressure-windings 1 and 2 are preferably stationary, while the current-winding 3 is preferably mounted upon a rotatable shaft 4, upon which winding, preferably by being attached to the shaft, is secured a pointer 5, that registers with a measuring-scale 6, with the middle point of which the pointer is adapted to register when the current and pressure in the working or transmission circuit are in phase. The scale 6 may be provided with a series of scale-marks that may serve to indicate when the needle registers therewith the extent to which the current and pressure are out of phase. The scale-marks are symmetrically arranged with respect to the central point with which the needle 5 registers when the current and pressure in the working circuit are in phase, the current when lagging in phase causing a deflection of the needle 5 toward the right to indicate the angle of lag, while the current in leading causes a deflection of the needle 5 toward the left to indicate the angle that the current leads. The current-coil 3 thus occupies a medium position when the current and pressure in the work-circuit are in phase, to secure which adjustment of the coil a balanced condition must be brought about between the field due thereto and the fields of the pressure-windings 1 and 2. This balanced condition is brought about by having the magnetism due to the current-coil 3 differing ninety degrees from the magnetism due to the coils 1 and 2. As the current and pressure in the working circuit vary in phase, obviously the phase of the magnetism due to the current-winding 3 varies with relation to the magnetism due to the windings 1 and 2, whereby the axis of the magnetism of winding 3 is caused to approach one or the other of the magnetic axes due to the windings 1 and 2. The winding 1 may produce a field that lags ninety degrees behind the impressed pressure, the line A A' indicating the magnetic axis of this field. The winding 2 produces a magnetic field that leads ninety degrees with respect to the impressed pressure, the line B B' indicating the axis of this field. The line C C' indicates the axis of the magnetic field due to the winding 3. If the current in the main circuit lags, the magnetism C C' due to the winding 3 also lags, thereby approaching the magnetism A A' in phase and causing a movement of the winding 3 and the pointer 5 in a contra-clockwise direction to indicate upon the scale 6 the angle of lag. If the current in the main circuit leads with respect to the impressed pressure, the magnetism C C' approaches the magnetism B B' in phase, thereby causing a clockwise movement of the pointer 5 to indicate upon the scale 6 the angle at which the current leads the pressure. In order that any small lag or lead will not send the pointer to the end of the scale, there must be some restraining torque applied to the coil 3 and its associated pointer 5. This restraining torque may be applied wholly or partially by the springs 23 23, which also serve to conduct the current to the coil 3, and this torque may be added to by the effect of gravity upon some part of the movable member, as upon the pointer in the case of Fig 1 and the coil 3 in Fig. 4. The combined action of the magnetizations of the coils 1 and 2 upon the coil 3 is thus opposed by this restraining torque, whereby a balance is obtained, indicating the phase difference, as desired. Any well-known means may be employed for securing magnetic fields in the windings of the meter having the desired phase displacements. In Figs. 1 and 4 I have illustrated a transformer 7, having its primary included in bridge of the working circuit and its secondary connected in circuit with both pressure windings or coils 1 and 2. The current-winding 3 is supplied from a transformer 8, whose primary winding is included in one of the main conductors and whose secondary winding is included in a closed local circuit with the said current-winding. In Fig. 4 I have illustrated the coils 1 and 2 provided, respectively, with secondary coils 9 and 10 included in circuit with adjusting-inductance 11 and 12, while inductance 13 and 14 is included in series with the windings 1 and 2. To secure a phase displacement of one hundred and eighty degrees, the terminals of these windings 1 and 2 a reversed with respect to each other. In Fig. 1 I have illustrated the windings 1 and 2 included serially in the same circuit with the secondary of the transformer 7. This circuit serially includes the winding 15 of a transformer 16, the remaining winding 17 of the transformer 16 being in parallel with the secondary of the transformer 7 and the windings 1 and 2. An adjusting resistance 18 is included in circuit with the transformer-winding 17. To secure a phase displacement of one hundred and eighty degrees between the fields due to the windings 1 and 2, the said windings are reversed with respect to each other. The effect is illustrated in Fig. 3, where O E indicates the impressed electromotive force. The coil 17 induces in the coil 15 a secondary current O G, which when combined with the current O F already flowing in the coil 15 produces a resultant current O H. By reversing one of the windings we have a current O H in one winding and a current O H' in the other winding producing magnetic fields displaced one hundred and eighty degrees. In order to maintain the proper magnetizing effects of the windings of the meter, compensating means, in this instance in the form of rheostats 19 20, are employed, the resistance of rheostat 19 being included in circuit with the pressure-windings, while the rheostat 20 is in circuit with the current-windings. Reading-scales 21 and 22 are associated with the resistances 19 and 20, upon which are volt and ampere scales. Whenever the instrument of my invention is to be operated, the arms of the rheostats 19 and 20 are moved to points along the reading-scales corresponding respectively to the pressure and current, so that the magnetizing effects due to the windings of the instrument are the same irrespective of the actual pressure and current in the distributing system. When the current and pressure in the work or transmission circuit are in phase, the phase of the field due to the current-winding 3 is displaced ninety degrees from the fields due to windings 1 and 2, as heretofore set forth, and a change in phase in the current of the work or transmission circuit causes a corresponding change in the phase of the magnetism of the current-winding and a deflection of the needle 5 to indicate a lagging or leading current and its phase relation to the pressure, all as heretofore set forth.

While I have herein shown and particularly described the preferred embodiment of my invention, it is obvious that changes may readily be made without departing from the spirit thereof, and I do not wish, therefore, to be limited to the precise disclosures herein set forth; but,

Having thus described my invention, I claim as new and desire to secure by Letters Patent—

1. The combination with a system of alternating-current distribution, of a measuring instrument for indicating the lag or lead of the current, having pressure-windings producing fields out of phase with the impressed electromotive force and with each other; a current-winding producing a field varying in phase with the current of the system, and differing from those of the fields produced by both pressure-windings, and means associated with the said windings, whereby the magnetizations of the exciting-coils are maintained constant, substantially as described.

2. The combination with an alternating-current system of distribution, of an instrument for determining the lagging or leading phase of the current, in respect to the pressure, the said instrument having one pressure-winding, producing a field lagging ninety degrees behind the impressed pressure of the system, a second pressure-winding producing a field displaced one hundred and eighty degrees from the field produced by the aforesaid pressure-winding; the current-winding producing a field varying in phase with the phase of the current of the system and rheostats associated with the said windings, whereby the magnetizations of the exciting-coils are maintained constant, substantially as described.

3. In a measuring instrument for indicating the lag or lead of the current, with respect to the pressure in a system of alternating-current distribution, the combination with pressure-windings producing fields out of phase with the impressed electromotive force, and with each other, of a current-winding producing a field varying in phase with the current of the system, and differing in phase from both pressure-windings, said current-winding being subject to the action of both pressure-windings, and means whereby the magnetizations of the exciting-coils are maintained constant, substantially as described.

4. In a measuring instrument for indicating the lag or lead of the current, with respect to the pressure in a system of alternating-current distribution, the combination with pressure-windings producing fields out of phase with the impressed electromotive force, and with each other, of a current-winding producing a field varying in phase with the current of the system, and differing in phase from both pressure-windings, said current-winding being subject to the action of both pressure-windings, and means whereby the ratio between the magnetizations of the exciting-coils may be maintained, substantially as described.

5. In a measuring instrument for indicating the lag or lead of the current, with respect to the pressure in a system of alternating-current distribution, the combination with pressure-windings producing fields out of phase with the impressed electromotive force, and with each other, of a current-winding producing a field varying in phase with the current of the system, and differing in phase from both pressure-windings, said current-winding being subject to the action of both pressure-windings, and means for preventing modification in the operation of the instrument by changes in the load condition, substantially as described.

In witness whereof I hereunto subscribe my name this 23d day of May, A. D. 1901.

THOMAS DUNCAN.

Witnesses:
GEORGE L. CRAGG,
HERBERT F. OBERGFF